(12) United States Patent
Chen Mazumdar et al.

(10) Patent No.: US 11,376,765 B1
(45) Date of Patent: Jul. 5, 2022

(54) WIRELESS SENSING AND CONTROL OF TEMPERATURE USING MAGNETIC FIELDS

(71) Applicant: National Technology & Engineering Solutions of Sandia, LLC, Albuquerque, NM (US)

(72) Inventors: Yi Chen Mazumdar, Atlanta, GA (US); Martin Nemer, Albuquerque, NM (US); Anirban Mazumdar, Atlanta, GA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 381 days.

(21) Appl. No.: 16/532,788

(22) Filed: Aug. 6, 2019

(51) Int. Cl.
| | |
|---|---|
| *G01N 3/26* | (2006.01) |
| *B29C 35/00* | (2006.01) |
| *G01K 7/36* | (2006.01) |
| *B29C 35/02* | (2006.01) |
| *C08J 5/00* | (2006.01) |
| *G05B 21/00* | (2006.01) |
| *G01N 11/00* | (2006.01) |
| *G01N 25/20* | (2006.01) |
| *G05D 23/19* | (2006.01) |

(Continued)

(52) U.S. Cl.
CPC ............ *B29C 35/002* (2013.01); *B29C 33/02* (2013.01); *B29C 35/02* (2013.01); *B29C 35/0288* (2013.01); *C08J 5/00* (2013.01); *G01K 7/36* (2013.01); *G01N 11/00* (2013.01); *G01N 25/20* (2013.01); *G05B 21/00* (2013.01); *G05D 23/19* (2013.01); *B29K 2063/00* (2013.01); *C08J 2363/00* (2013.01); *G01N 2011/0086* (2013.01); *G01N 2011/0093* (2013.01); *G01N 2203/0092* (2013.01)

(58) Field of Classification Search
CPC combination set(s) only.
See application file for complete search history.

(56) References Cited

U.S. PATENT DOCUMENTS

| | | | |
|---|---|---|---|
| 5,145,614 A | * | 9/1992 | Kuroda .................... B29C 70/62 |
| | | | 148/101 |
| 9,579,619 B2 | * | 2/2017 | Hottovy ............... B01J 19/0013 |

(Continued)

FOREIGN PATENT DOCUMENTS

| | | | | |
|---|---|---|---|---|
| CN | 107428874 A | * | 12/2017 | ............ B01J 19/002 |
| WO | WO-2015004830 A1 | * | 1/2015 | ............. H01L 24/16 |

*Primary Examiner* — Lisa M Caputo
*Assistant Examiner* — Nasir U. Ahmed
(74) *Attorney, Agent, or Firm* — Yee & Associates, P.C.

(57) ABSTRACT

A method and system for sensing and controlling temperature with magnetic fields are provided. The method comprises placing a compound in thermal communication with a number of temperature or heat sources and placing a number of magnets in thermal communication with the compound. A number of magnetic sensors are placed in electromagnetic communication with the number of magnets. Changes in the magnetic field of the magnets are detected by the sensors and used to determine the temperature of the compound according to a model that maps magnetic field characteristics to temperature. The amount of cure of the compound can then be estimated from the temperature. The temperature or heat sources are controlled in response to the temperature measurement and the estimated amount of cure of the compound.

21 Claims, 5 Drawing Sheets

(51) Int. Cl.
   *B29C 33/02*   (2006.01)
   *B29K 63/00*   (2006.01)

(56) References Cited

U.S. PATENT DOCUMENTS

| | | | |
|---|---|---|---|
| 2014/0355644 A1* | 12/2014 | Gupta | G01K 7/36 |
| | | | 374/4 |
| 2014/0369383 A1* | 12/2014 | Yousef | G01N 33/08 |
| | | | 374/137 |
| 2015/0381091 A1* | 12/2015 | Henderson | H02P 6/183 |
| | | | 318/400.33 |

* cited by examiner

WIRELESS SENSING AND CONTROL OF TEMPERATURE USING MAGNETIC FIELDS

STATEMENT OF GOVERNMENT INTEREST

This invention was made with United States Government support under Contract No. DE-NA0003525 between National Technology & Engineering Solutions of Sandia, LLC and the United States Department of Energy/National Nuclear Security Administration. The United States Government has certain rights in this invention.

BACKGROUND

1. Field

The disclosure relates generally to temperature sensing, and more specifically to determining and controlling temperature according to changes in magnetic fields.

2. Description of the Related Art

Exothermic polymers such as epoxies and resins have emerged as popular constituents in high strength and lightweight materials such as fiber-reinforced composites. Curing of such materials typically takes place in ovens under temperature control. The curing process of exothermic polymers results in the release of heat, which can affect the quality of the part if not properly regulated. Part quality can be degraded by excessive temperatures, temperature gradients, residual stresses, and incomplete curing. In addition, mold shape and material properties can also affect the thermal behavior of the system, preventing the use of pre-computed or pre-validated algorithms. Therefore, the intelligent monitoring and control of the nonlinear, temperature dependent, resin cure processes has become an area of increasingly important research.

Many manufacturing processes involve sealed and optically opaque molds and ovens where access for wires is challenging. Therefore, many current approaches attempt to regulate internal processes with only limited knowledge of the internal behavior. Wireless temperature monitoring can enable improvements in part quality and manufacturing speed by enabling feedback control based on knowledge of the internal states. Magnetic field-based techniques are a particularly promising method for wirelessly monitoring temperature as well as position and orientation information. Exploiting the temperature induced change in the magnetic field of permanent magnets holds particular promise for monitoring composite materials because such methods can sense through metal vessels and only require passive sensing of the magnetic field.

SUMMARY

An illustrative embodiment provides a method of sensing and controlling temperature with magnetic fields. The method comprises placing a compound in thermal communication with temperature or heat sources and placing a number of magnets in thermal communication with the compound. A number of magnetic sensors are placed in electromagnetic communication with the number of magnets. Changes in the magnetic field of the magnets are detected by the sensors and used to determine the temperature of the compound according to a model that maps magnetic field characteristics to temperature. The amount of cure of the compound can then be estimated from the temperature. The temperature or heat sources are controlled in response to the temperature measurement and the estimated amount of cure of the compound.

Another illustrative embodiment provides a system for sensing and controlling temperature. The system comprises a number of surfaces configured to hold a compound and a number of temperature or heat sources coupled to the surfaces. A number of magnets are positioned to be in thermal communication with the compound held by the surfaces, and a number of magnetic sensors positioned to be in electromagnetic communication with the magnets. A number of processors are in communication with the magnetic sensors and temperature or heat sources, wherein the number of processors are configured to execute program instructions to: detect, via the magnetic sensors, changes in the magnetic field of the number of magnets; determine a temperature of the compound held by the number of surfaces according to a model that maps magnetic field characteristics to temperature; estimate an amount of cure of the compound according to the temperature; and control the temperature or heat sources in response to the temperature and the estimated amount of cure.

DETAILED DESCRIPTION

The illustrative embodiments recognize and take into account one or more different considerations. For example, the illustrative embodiments recognize and take into account that epoxies and resins can require careful temperature sensing and control during curing in order to monitor and prevent degradation.

Illustrative embodiments also recognize and take into account that permanent magnets can be embedded directly into molds, attached to fixed components, or placed between rigid layers. The wireless nature of the magnetic-field temperature measurements requires no holes to be drilled into molds; holes are required for wired temperature sensing. Therefore, it can be implemented directly in existing systems. After the material is cured, the low-cost magnets can remain in the cured component for future temperature measurements. The magnet can be demagnetized after use with external coils if desired. This approach fundamentally differs from thermocouple and optical-fiber based approaches due to the elimination of all physical connection to the inside of the mold. The use of magnetic fields enables completely wireless sensing and control of internal states. Similarly, this work differs from optical sensing techniques because our techniques enable the use of opaque molds and polymers. In addition, optical techniques may have difficulty resolving the internal temperatures of a three-dimensional resin.

Figure 1:
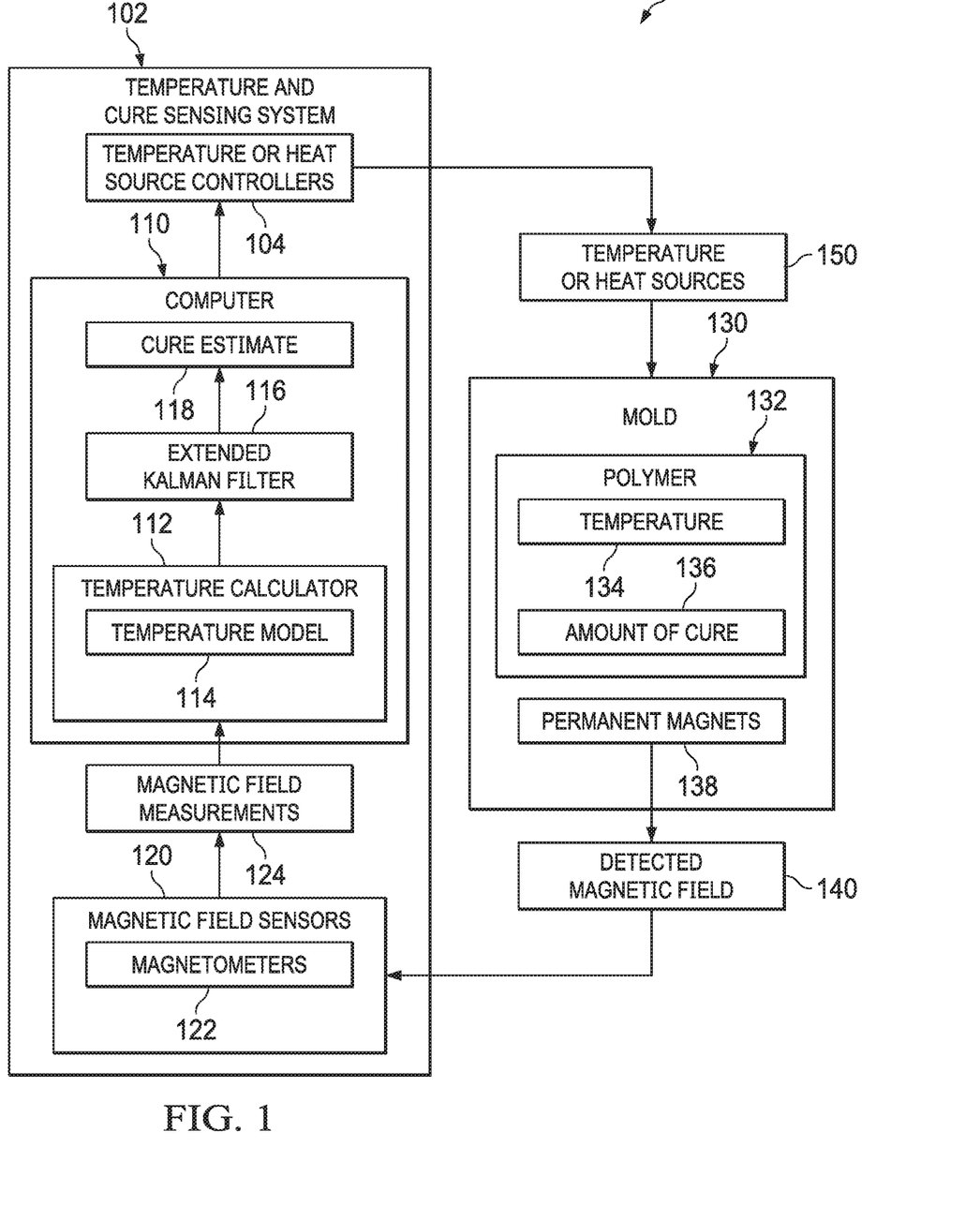
FIG. 1 depicts a block diagram of a system for sensing and controlling temperature using magnetic fields in accordance with an illustrative embodiment.

Turning to FIG. 1, a block diagram of a system for sensing and controlling temperature using magnetic fields is depicted in accordance with an illustrative embodiment. The temperature sensing and control system 100 is configured to detect the temperature 134 of polymer 132 in mold 130.

Mold 130 can be optically and thermally opaque but magnetically transparent. Magnetically transparent mold 130 is transparent to magnetic fields. For example, the mold may be constructed of aluminum, copper, brass, or austenitic stainless steel.

Alternatively, the mold 130 can be replaced with a simply flat, horizontal surface, or a number of objects between which the polymer 132 is placed.

In accordance with an illustrative embodiment, polymer 132 has a number of permanent magnets 138 imbedded in, attached or position near it to be in thermal communication with the polymer.

Temperature and cure sensing system 102 can comprise magnetic field sensors 120 and computer 110. Magnetic field sensors 120 can be configured to detect magnetic field 140, wherein detected magnetic field 140 is generated by the permanent magnets 138 in/on/near polymer 132.

For example, magnetic field sensors 120 can comprise magnetometers 122. Information regarding detected magnetic field 140 can be provided as magnetic field measurements 124 to computer 110.

Computer 110 can be implemented using any appropriate information processing system. Computer 110 can be configured using any appropriate hardware or hardware in combination with software to implement temperature calculator 112, extended Kalman filter 116, and cure estimate 118.

As a number of temperature or heat sources 150 heat the polymer 132 in the mold 130 and the polymer 132 releases heat through exothermic reactions, temperature calculator 112 uses a temperature model 114 to determine the temperature 134 of the polymer 132 based on magnetic field measurements 124 provided by magnetic field sensors 120.

The temperature calculation is then fed into an extended Kalman filter 116 to produce an estimate 118 of the amount of cure 136 of the polymer 132. A number of temperature or heat source controllers 104 control the output of the temperature or heat sources 150 based on the calculated temperature and estimated amount of cure of the polymer 132.

The illustration of temperature sensing and control system 100 in FIG. 1 is not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

Figure 2:
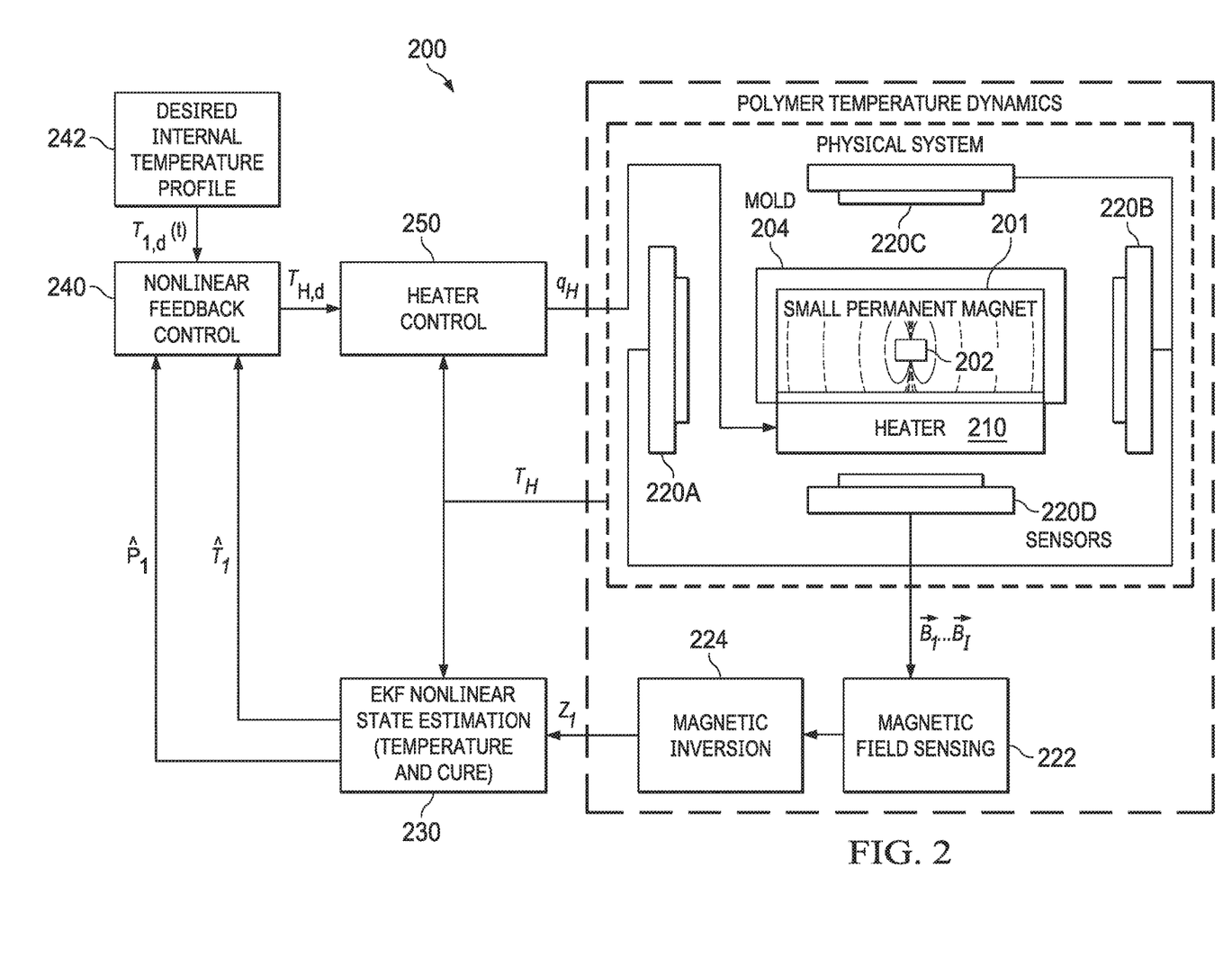
FIG. 2 is a diagram depicting a temperature sensing and nonlinear feedback control system in accordance with illustrative embodiments.

FIG. 2 is a diagram depicting a temperature sensing and nonlinear feedback control system in accordance with illustrative embodiments. System 200 comprises at least one permanent magnet 202 embedded in or in close proximity to a polymer 201. It should be noted that multiple magnets can be used, but for ease of illustration, the example in FIG. 2 depicts only one. In this illustrative embodiment, the polymer 201 and magnet 202 are contained in a mold 204 that is magnetically transparent but can be optically opaque. As mentioned above, the polymer 201 can also be held on a flat surface or located between a number of objects acting as containing surface. The magnet can also be held between different sheets of a composite material held together by the compound.

Polymer 201 is heated by heater 210 that is in thermal communication with the mold 204 and polymer 201.

Figure 3:
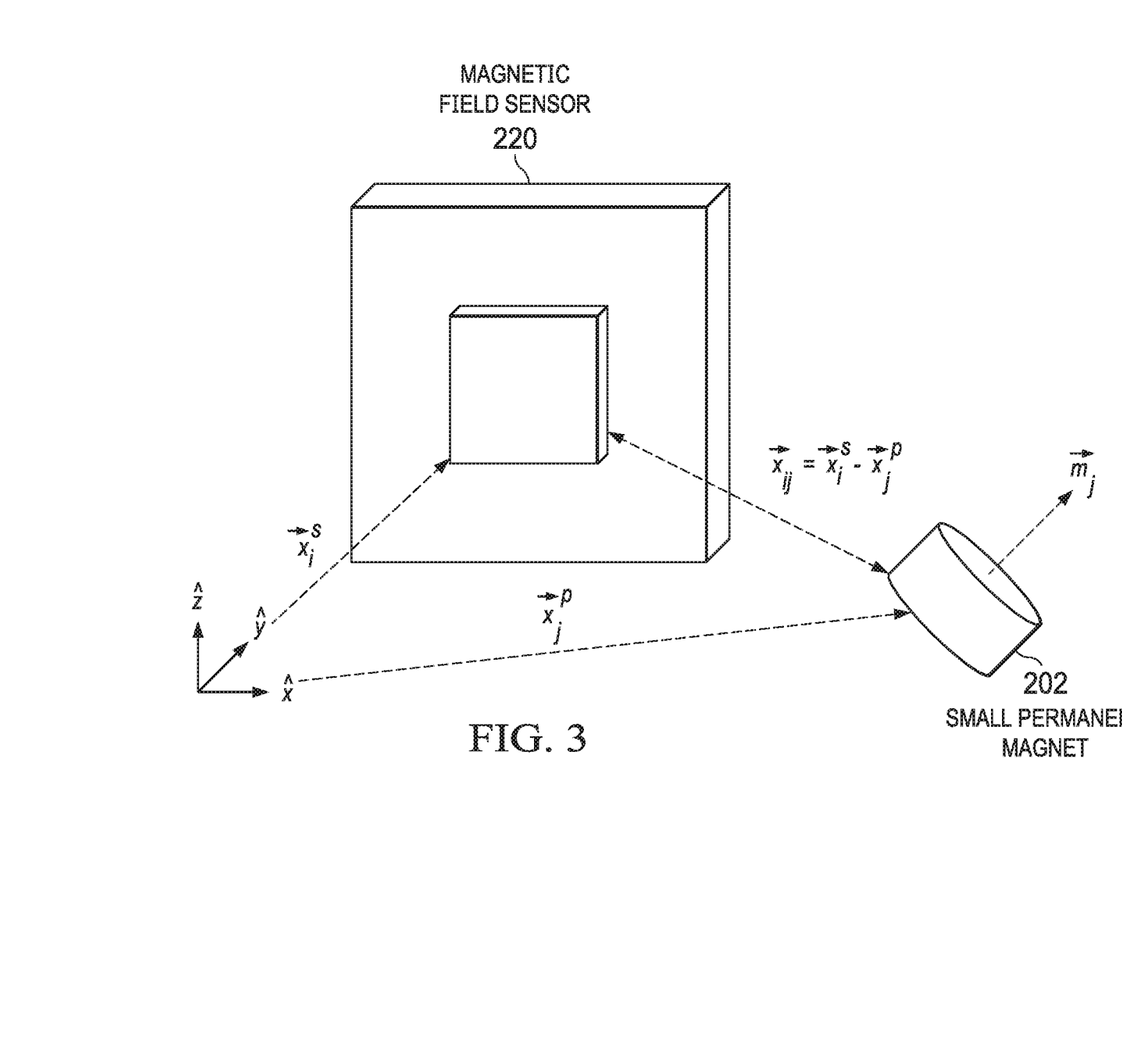
FIG. 3 depicts a three-axis magnetic sensor with which illustrative embodiments can be implemented.

A number of three-axis magnetic sensors 220a-220d are positioned outside the mold 204. These sensors can comprise three-axis sensors as shown in FIG. 3 and described in detail below. In this illustrative example, two sensors 220a, 220b are positioned at opposite ends of the mold 204, and two sensors 220c, 220d are positioned above and below the mold 204, respectively.

The field strength of permanent magnets change based on their temperature. As temperature increases, the microscopic magnetic domains inside permanent magnetics orient themselves more randomly, thereby reducing the overall magnetic field strength. Changes in the magnetic field of magnet 202 resulting from change in temperature are detected by magnetic sensors 220a-d.

An example of using a temperature model to determine temperature of the polymer can be described using a simple dipole model to serve as a preliminary model for mapping geometry and changes in the magnetic field to temperature.

FIG. 3 depicts a three-axis magnetic sensor 220 with which illustrative embodiments can be implemented. It also illustrates coordinate system conventions for mapping the temperature of small permanent magnet 202. In an embodiment magnetic sensor 220 is a custom magnetic field sensing board using a three-axis Honeywell HMC1053 sensor. Wheatstone bridges are used for each axis in order to measure the change in the magnetoresistance of a thin Permalloy film. The sensor has a high temperature coefficient, and must be isolated from temperature fluctuations in the absence of temperature compensation circuitry. Generally, thermal isolation via separation from temperature sources is sufficient. The magnetic field sensor interfaces with a control computer using a PXI-6255 data acquisition card and NI-PXIe-1073 chassis with differential analog measurement channels.

In an embodiment magnet 202 is a small (3.2 mm diameter, 1.6 mm thickness) neodymium iron boron (Nd—Fe—B) grade N42SH magnet. The N42SH grade Nd—Fe—B magnet is chosen due to its high magnetic field density and high temperature sensitivity $C_T$ for the desired temperature range.

The process begins by defining an ensemble of permanent magnetic field particles i=1, . . . , J located at positions $\vec{x}_j^P = (\vec{x}_{jx}^P, \vec{x}_{jy}^P, \vec{x}_{jz}^P)^T$ with normalized orientations $\vec{m} = (\vec{m}_{jx}, \vec{m}_{jy}, \vec{m}_{jz})^T$ and magnetic field sensors i=1, . . . , I located at positions $\vec{x}_i^s = (\vec{x}_{ix}^s, \vec{x}_{iy}^s, \vec{x}_{iz}^s)^T$. The magnetic field from the residual induction of a single particle on a single sensor using a simple dipole model can be approximated as $$\vec{B}_{ij} = B_j(T)\left(\frac{3(\vec{m}_j \cdot \vec{x}_{ij}) \cdot \vec{x}_{ij}}{R_{ij}^5} - \frac{\vec{m}_j}{R_{ij}^3}\right)$$

where $\vec{x}_{ij} = \vec{x}_i^s - \vec{x}_j^P$ is the relative position, $R_{ij} = \|\vec{x}_i^s - \vec{x}_j^P\|$ is the distance.

The magnetic field at room temperature is $$B_j(T_0) \approx \frac{\mu_0}{4\pi}\mu_r M_0 V_j$$

where $M_0$ is the uniform magnetization, $\mu_r$ is the relative permeability, $\mu_0$ is the magnetic vacuum permeability, and $V_j$ is the volume of the magnet. The total contribution of J magnets on sensor i is $\vec{B}_i = \Sigma \vec{B}_{ij} + \vec{C}_i$ where $\vec{C}_i$ are offset constants from fixed external magnetic fields like the magnetic field of the earth.

If the magnetic positions and orientation are stationary or known, then the temperature solution simplifies to a series of linear equations. Known information for positions, orientations, and magnetic field magnitudes at the calibration temperature are captured by $\vec{P}_{sij} = (P_{ijx}, P_{ijy}, P_{ijz})^T$. Therefore, the total field contribution of J magnets on sensor i can be rewritten as:

$$\vec{B}_i - \vec{C}_i = \Sigma(1 - C_T(T_j - T_0))\vec{P}_{sij}(\vec{x}_{ij}, \vec{m}_j)$$

This formulation provides the model for the magnetic field sensing 222 in FIG. 2.

The equations can also be written in linear matrix form $P_s \vec{D}_s = \vec{Y}$, where $\vec{Y} = \vec{B} - \vec{C}$ is the 3I×1 vector representing the calibrated sensor measurements. The vector $\vec{D}_s = 1 - C_T(\vec{T} - T_0)$ has the dimensions J×1, where $\vec{T}$ is the vector of magnet temperatures. $P_S$ has dimensions 3I×J.

If 3I≥J, then least squares minimization can be used to produce a solution $\vec{D}_s = (P_S^T P_S)^{-1} P_S^T \vec{Y}$, giving the magnetic field inversion 224 in FIG. 2.

The temperature solution is then obtained for each magnet at each point in time:

$$T_j = \frac{1}{C_T}(1 - \vec{D}_{sj}) + T_0$$

The temperature estimate noise, $\epsilon_T$, is dominated by average electronic measurement noise $\epsilon_B$ and is described by the properties of the $P_S$ matrix, $\epsilon_{Tj} = \epsilon_B / C_T \sqrt{\text{diag}((P_S^T P_S)^{-1})}$, which can be used to estimate noise level for a given magnet and sensor configuration.

Using the magnetic field sensing and magnetic field inversion described above to a N42SH grade Nd—Fe—B magnet the temperature within the mold the can be accurately estimated up to ~90° C. with a temperature sensitivity of $C_T$=0.115±0.005%. Temperature measurement errors are 2° C. or less.

From the temperature determined by changes in the magnetic field, the amount of curing of the polymer 201 inside the mold 204 can be estimated. Understanding the heat transfer and cure dynamics of polymers is essential for modeling, estimation, and control. Epoxy resins are generally mixed with a curative agent to form a three-dimensional cross-linked structure with desirable properties such as mechanical strength and thermal resistance. The process of forming this cross-linked structure is known as curing or gelation. The curing process can be quantified with a number between 0 and 1 representing the fraction of the material that has achieved the cross-linked three-dimensional structure. This number is known as the amount of cure, p.

Figure 4:
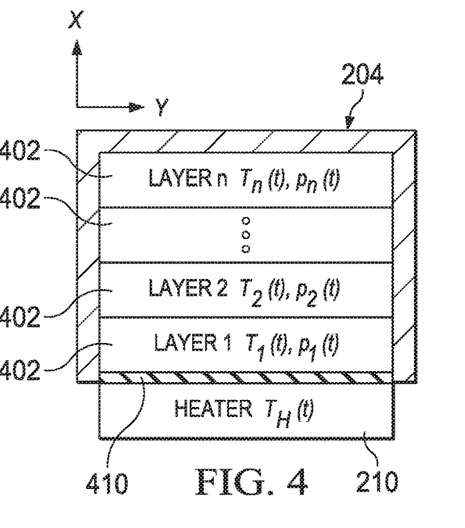
FIG. 4 depicts a multi-layered resin cure model with a heated surface in accordance with an illustrative embodiment.

FIG. 4 depicts a multi-layered resin cure model with a heated surface in accordance with an illustrative embodiment. In this example, the epoxy sample comprises n layers 402 and is cured with a heated surface 410. $T_l$ (in ° C.) and $p_l$ are used to determine the temperature and cure of the l-th layer.

Internal heat transfer is dominated by conduction. The top layer (Layer n) adjacent to the top wall of the mold 204 is assumed not to conduct heat to the environment, the walls are assumed to be adiabatic, and the bottom layer (Layer 1) adjacent to the heated surface 410 of temperature $T_H$ absorbs heat through conduction. Each layer has dimensions $\Delta x$, $\Delta y$ (for this exemplary case $\Delta x = \Delta y$), $\Delta z$ with the same mass, $m_s$. The internal temperature fluctuation due to the heater 210 and the thermal conduction can be written with matrices. The variables $k_s$ and $\rho_s$ represent thermal conductivity and density respectively. The matrix $A_T$ is the state transition matrix, and is based on the layer dimensions. The matrix $B_T$ is the input matrix and is also based on the layer dimensions. $X_T$ is the vector consisting of the temperature of each discrete layer. $X_p$ is the cure percentage level of each discrete layer. The variable $c_{p,s}$ represents the specific heat of the polymer.

$$\dot{X}_T = \begin{bmatrix} \dot{T}_1 \\ \vdots \\ \dot{T}_n \end{bmatrix} = A_T X_T + B_T T_H + \frac{H_r}{c_{p,s}} \dot{X}_P$$

$$A_T = \begin{bmatrix} -3 & 1 & 0 & 0 \\ 1 & -2 & 1 & 0 \\ \cdots & \cdots & \cdots & \cdots \\ 0 & 0 & 1 & -1 \end{bmatrix} \frac{k_s}{\rho_s c_{p,s} \Delta x^2}$$

$$B_T = \begin{bmatrix} 2 \\ 0 \\ \cdots \\ 0 \end{bmatrix} \frac{k_s}{\rho_s c_{p,s} \Delta x^2}$$

The internal heat generation from the polymer curing process requires an additional nonlinear kinetic model. The amount of heat released by a layer of the exothermic polymer during cure is related to the rate of change of the polymer cure, $X_p$, and the resin heat of reaction $H_r$.

$$\dot{X}_p = k_0 \exp\left[\frac{-E_a}{R} \frac{1}{X_T + 273}\right](b_r + X_p^{m_r})(1 - X_p)^{n_r}$$

Here, R represents the ideal gas constant, and $k_0$, $b_r$, $m_r$, $n_r$, $E_a$ are all determined empirically.

In addition to using magnetic sensing techniques to enable temperature measurement from within the polymer, illustrative embodiments also enable estimation of the level of cure. Cure level is important because it influences quality and the thermal-kinetic system dynamics. Therefore, the layer cure level, $X_p$, is valuable for both monitoring and feedback control. Because the thermal-kinetic dynamics described above are nonlinear, the illustrative embodiments use an Extended Kalman filter (EKF) to provide estimated system states $(\hat{X}_T, \hat{X}_p)$ from the magnetic temperature estimates, $T_{l,m}$.

In the case of a multilayer resin cure model such as that shown in FIG. 4, a separate magnet can be embedded to monitor temperature in each layer. The layers can vary in size depending on system requirements. Using a continuous-time EKF with discrete-time measurements, the temperature and cure level states are aggregated into a single vector, $\dot{X} = [\dot{X}_T(t) \dot{X}_p(t)]^T = [f_T(X, T_H) f_P(X)]^T + \omega(t)$ (number of states, N, is equal to 2n). For this system, the heater temperature, $T_H$, is treated as the system input. The system dynamics are subject to process noise, $\omega(t)$.

Since the measured states, z (subject to measurement noise, v(t)) are just the temperatures, the observation matrix H is a n by N matrix of constants. Here the variable k represents the sample number and $t_k$ represents the time when sample k was taken.

$$z_k = HX(t_k) + v_k$$

The continuous-time, discrete-sample EKF combines a continuous time model with discrete-time updates. The time update of the state estimate, $\hat{X}$, and the error covariance matrix, P, are computed over every time step using the continuous time models.

$$\dot{\hat{X}} = f(\hat{X}, X_H)$$

$$\dot{P} = F(\hat{X})P + PF^T(\hat{X}) + Q$$

The F(t) matrix is computed continuously based on the estimated system state and system input.

$$F(t) = \left.\frac{\partial f}{\partial X}\right|_{\hat{X}(t)}$$

The measurement updates are then performed in discrete time at each sample k. The matrix $P^-$ is the error covariance matrix computed in the previous iteration $$K_k = P^-(t_k)H^T[HP^-(t_k)H^T + R]^{-1}$$

$$P = [I - K_k H]P^-(t_k)$$

$$\hat{X} = \hat{X}_k^- + K_k[z_k - H\hat{X}_k^-]$$

This system of equations describes the nonlinear state (temperature and cure) estimation 230 in FIG. 2. This estimate of the internal temperate and cure $(\hat{X}_T, \hat{X}_p)$ can be used to enhance control performance.

The EKF 230 provides continuous estimates of both internal temperature and cure information to the feedback control system 240, where it is compared to a desired internal temperature profile 242. The heater control 250 regulates the temperature of the heater 210 and enables the use of the simplified models described above ($T_H$ as an input). The configuration shown in FIG. 2 enables the use of nonlinear control via feedback linearization.

For example, if there is a single layer we can write $A_T$ and $B_T$ as scalar quantities.

$$\dot{T}_1 = A_T T_1 + B_T T_H + \frac{H_r}{C_{p,s}}\dot{X}_{p1} = g(T_1, X_{p1}) + B_T T_H = v$$

We choose v so that our system model has first order error dynamics that converge to zero with a time constant 1/a. Since $T_1$ and $X_{p1}$ are not known, we can use a value from our state estimator.

$$T_H(t) = \frac{1}{B_T}\left(T_{1,d}(t) - a(\hat{T}_1(t) - T_{d,1}(t)) - g(\hat{T}_1(t), \hat{X}_{p1}(t))\right)$$

These equations serve to describe the nonlinear feedback control block.

Nonlinear control improves the closed loop dynamic performance and facilitates better tracking of time-varying temperature trajectories. Typically, curing of exothermic polymers involves a tradeoff between rate of cure and thermal gradients. High heater temperatures provide higher internal temperatures and higher cure rates, but also create large temperature differences between the heater surface and the polymer. Such gradients (including gradients between $T_H$ and $T_1$) are undesirable because they can lead to residual stresses in the cured material.

The temperature trajectory is chosen according to the parameter sought to be optimized. For example, the internal temperature trajectory over time can be selected to minimize temperature gradients within the compound during curing. The temperature trajectory can also be selected to minimize total cure time or to minimize shrinkage or internal stresses. The internal temperature trajectory over time can also be selected to avoid high peak temperatures that damage the compound.

In an embodiment, the internal temperature trajectory used is relatively fast but also produces low temperature gradients. The internal temperature trajectory, $T_1(t)$, is parameterized as a sigmoid that starts at ambient temperature and ends at 70° C. (a typical curing temperature). In this manner, the trajectory is optimized over a single parameter, $t_s$, which is the timescale over which the sigmoid evolves. This approach can be used to identify trajectories based on the desired tradeoffs.

Figure 5:
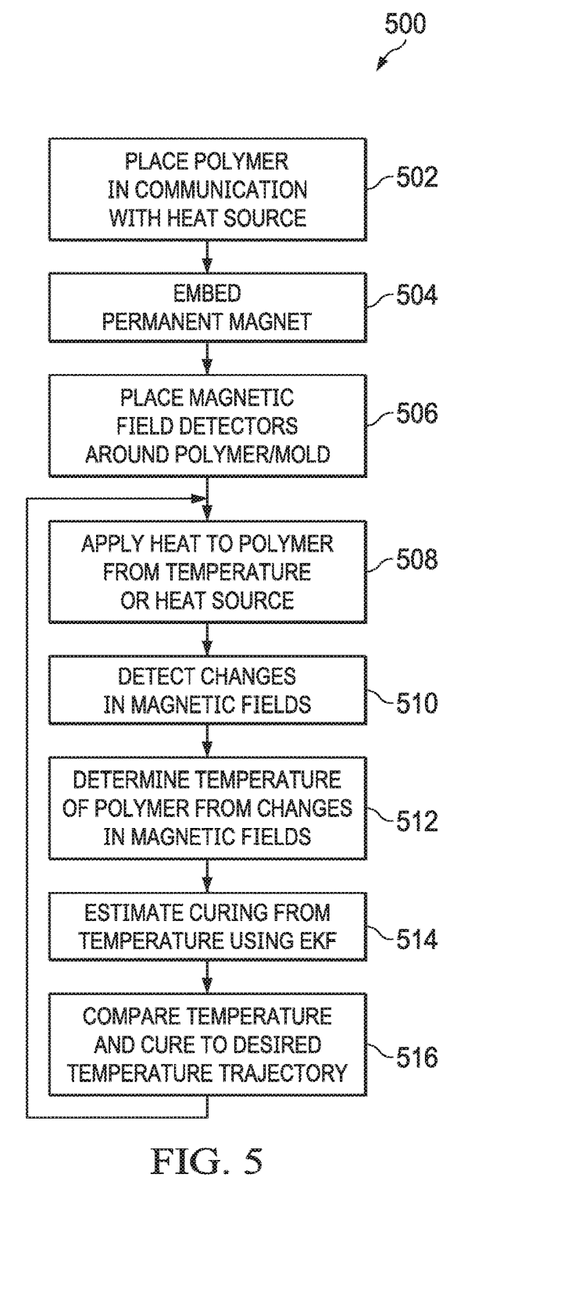
FIG. 5 is a flowchart depicting a process for sensing and controlling temperature using magnetic fields in accordance with illustrative embodiments.

FIG. 5 is a flowchart depicting a process for sensing and controlling temperature using magnetic fields in accordance with illustrative embodiments. Process 500 begins by placing a polymer or similar compound in thermal communication with a heat source (step 502). This can involve putting the polymer in an enclosed mold or some other suitable staging surface to hold the polymer during heating as described above. At least one permanent magnet is embedded with the polymer (step 504). This can comprise placing the magnet inside the polymer or between polymer layers as described above, placing the magnet in contact with the outside of the polymer, or placing the magnet inside the mold in proximity of the polymer, as long as the magnet is in thermal communication with the polymer.

Magnetic field sensors are placed around the polymer or mold if the polymer is enclosed in a mold (step 506). The distance between the permanent magnet and field detectors should be close enough to place the detectors within electromagnetic communication with the magnet.

The temperature or heat source is then activated and adjusted to apply the desired amount of heat to the polymer (step 508). As the polymer increases in temperature, both from the temperature or heat source and exothermic curing, the detectors detect changes in the magnetic field of the permanent magnet (step 510).

The internal temperature of the polymer is then determined from the detected changes in the magnetic fields according to the methods described above (step 512). This process 500 estimates the amount of cure of the polymer by applying an Extended Kalman Filter (EKF) in the manner described above (step 514). The temperature and cure state are compared to a desired temperature trajectory (step 516). Using this feedback, the heat or temperature source is controlled and adjusted as necessary to match the desired temperature trajectory.

Figure 6:
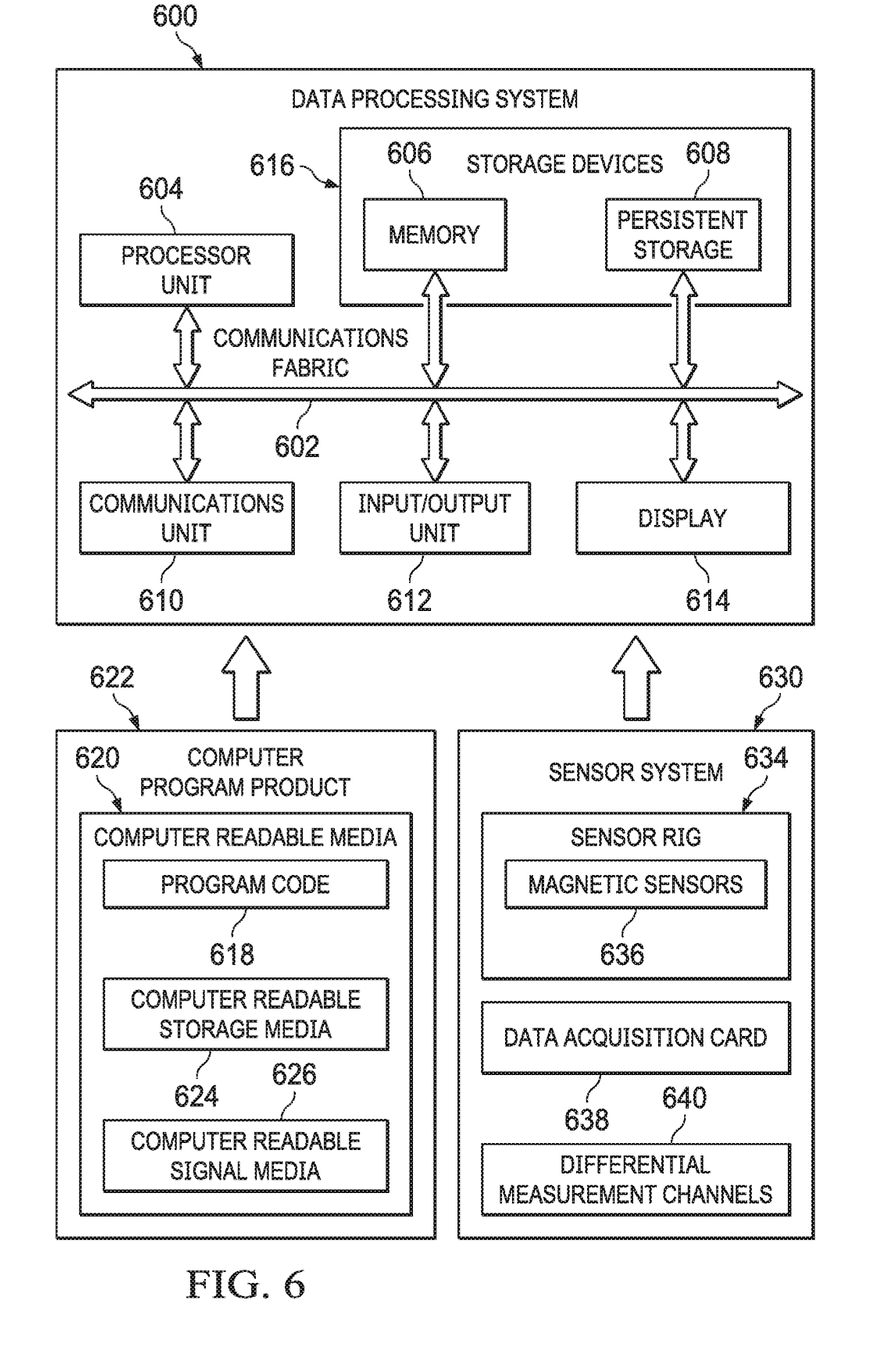
FIG. 6 is a diagram of a data processing system depicted in accordance with an illustrative embodiment.

Turning to FIG. 6, a diagram of a data processing system is depicted in accordance with an illustrative embodiment. Data processing system 600 is an example of a system in which computer-readable program code or program instructions implementing processes of illustrative embodiments may be run and can be an example of computer 110 in FIG. 1. In this illustrative example, data processing system 600 includes communications fabric 602, which provides communications between processor unit 604, memory 606, persistent storage 608, communications unit 610, input/output unit 612, and display 614.

Processor unit 604 serves to execute instructions for software applications and programs that may be loaded into memory 606. Processor unit 604 may be a set of one or more hardware processor devices or may be a multi-processor core, depending on the particular implementation. Further, processor unit 604 may be implemented using one or more heterogeneous processor systems, in which a main processor is present with secondary processors on a single chip. As another illustrative example, processor unit 604 may be a symmetric multi-processor system containing multiple processors of the same type.

A computer-readable storage device is any piece of hardware that is capable of storing information, such as, for example, without limitation, data, computer-readable program code in functional form, and/or other suitable information either on a transient basis and/or a persistent basis. Further, a computer-readable storage device excludes a propagation medium. Memory 606, in these examples, may be, for example, a random access memory, or any other suitable volatile or non-volatile storage device. Persistent storage 608 may take various forms, depending on the particular implementation. For example, persistent storage 608 may contain one or more devices. For example, persistent storage 608 may be a hard drive, a flash memory, a rewritable optical disk, a rewritable magnetic tape, or some combination of the above. The media used by persistent storage 608 may be removable. For example, a removable hard drive may be used for persistent storage 608.

Communications unit 610, in this example, provides for communication with other computers, data processing systems, and devices via network communications unit 610 may provide communications using both physical and wireless communications links. The physical communications link may utilize, for example, a wire, cable, universal serial bus, or any other physical technology to establish a physical communications link for data processing system 600. The wireless communications link may utilize, for example, shortwave, high frequency, ultra-high frequency, microwave, wireless fidelity (WiFi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 600.

Input/output unit 612 allows for the input and output of data with other devices that may be connected to data processing system 600. For example, input/output unit 612 may provide a connection for user input through a keypad, keyboard, and/or some other suitable input device. Display 614 provides a mechanism to display information to a user and may include touch screen capabilities to allow the user to make on-screen selections through user interfaces or input data, for example.

Instructions for the operating system, applications, and/or programs may be located in storage devices 616, which are in communication with processor unit 604 through communications fabric 602. In this illustrative example, the instructions are in a functional form on persistent storage 608. These instructions may be loaded into memory 606 for running by processor unit 604. The processes of the different embodiments may be performed by processor unit 604 using computer-implemented program instructions, which may be located in a memory, such as memory 606. These program instructions are referred to as program code, computer-usable program code, or computer-readable program code that may be read and run by a processor in processor unit 604. The program code, in the different embodiments, may be embodied on different physical computer-readable storage devices, such as memory 606 or persistent storage 608.

Program code 618 is located in a functional form on computer-readable media 620 that is selectively removable and may be loaded onto or transferred to data processing system 600 for running by processor unit 604. Program code 618 and computer-readable media 620 form computer program product 622. In one example, computer-readable media 620 may be computer-readable storage media 624 or computer-readable signal media 626. Computer-readable storage media 624 may include, for example, an optical or magnetic disc that is inserted or placed into a drive or other device that is part of persistent storage 608 for transfer onto a storage device, such as a hard drive, that is part of persistent storage 608. Computer-readable storage media 624 also may take the form of a persistent storage, such as a hard drive, a thumb drive, or a flash memory that is connected to data processing system 600. In some instances, computer-readable storage media 624 may not be removable from data processing system 600.

Alternatively, program code 618 may be transferred to data processing system 600 using computer-readable signal media 626. Computer-readable signal media 626 may be, for example, a propagated data signal containing program code 618. For example, computer-readable signal media 626 may be an electromagnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 618 may be downloaded over a network to persistent storage 608 from another device or data processing system through computer-readable signal media 626 for use within data processing system 600. For instance, program code stored in a computer-readable storage media in a data processing system may be downloaded over a network from the data processing system to data processing system 600. The data processing system providing program code 618 may be a server computer, a client computer, or some other device capable of storing and transmitting program code 618.

Input to data processing system 600 can be provided by a sensor system 630. The sensor system comprises a number of magnetic sensors 636 that are attached to a sensor rig 634.

The magnetic sensors 636 are connected via to a custom board that interfaces with a data acquisition card 638 and differential analog measurement channels 640.

The different components illustrated for data processing system 600 are not meant to provide architectural limitations to the manner in which different embodiments may be implemented. The different illustrative embodiments may be implemented in a data processing system including components in addition to, or in place of, those illustrated for data processing system 600. Other components shown in FIG. 6 can be varied from the illustrative examples shown. The different embodiments may be implemented using any hardware device or system capable of executing program code. As one example, data processing system 600 may include organic components integrated with inorganic components and/or may be comprised entirely of organic components excluding a human being. For example, a storage device may be comprised of an organic semiconductor.

As another example, a computer-readable storage device in data processing system 600 is any hardware apparatus that may store data. Memory 606, persistent storage 608, and computer-readable storage media 624 are examples of physical storage devices in a tangible form.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 606 or a cache such as found in an interface and memory controller hub that may be present in communications fabric 602.

The present invention may be a system, a method, and/or a computer program product. The computer program product may include a computer-readable storage medium or media having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer readable program instructions to personalize the electronic circuitry, in order to perform aspects of the present invention.

The flowchart and block diagrams in the different depicted embodiments illustrate the architecture, functionality, and operation of some possible implementations of apparatuses and methods in an illustrative embodiment. In this regard, each block in the flowchart or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowchart or the block diagrams may be implemented using special purpose hardware systems that perform the different operations or combinations of special purpose hardware and program code run by the special purpose hardware. Some steps of the process may be implemented by an additive manufacturing machine such as, for example, a 3D printer.

In some alternative implementations of an illustrative embodiment, the function or functions noted in the blocks may occur out of the order noted in the figure. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Detailed embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive.

Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

For purposes of the description hereinafter, the terms "upper," "lower," "right," "left," "vertical," "horizontal," "top," "bottom," and derivatives thereof shall relate to the embodiments of the disclosure, as it is oriented in the drawing figures. The terms "positioned on" means that a first element, such as a first structure, is present on a second element, such as a second structure, wherein intervening elements, such as an interface structure, e.g. interface layer, may be present between the first element and the second element.

In this disclosure, when an element, such as a layer, region, or substrate is referred to as being "on" or "over" another element, the element can be directly on the other element or intervening elements can also be present. In contrast, when an element is referred to as being "directly on," "directly over," or "on and in direct contact with" another element, there are no intervening elements present, and the element is in contact with another element.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method of sensing and controlling temperature, the method comprising:
    placing a compound in thermal communication with a number of temperature or heat sources;
    placing a number of magnets in thermal communication with the compound;
    placing a number of magnetic sensors in electromagnetic communication with the number of magnets;
    detecting, by the magnetic sensors, changes in the magnetic field of the number of magnets;
    determining, by a number of processors, a temperature of the compound according to a model that maps magnetic field characteristics to temperature;
    estimating, by the number of processors, an amount of cure of the compound according to the temperature; and
    controlling, by the number of processors, the temperature or heat sources in response to the temperature and the estimated amount of cure.

2. The method of claim 1, wherein the compound is an exothermic polymer.

3. The method of claim 1, wherein the amount of cure is estimated from the temperature inside the compound using an extended Kalman filter.

4. The method of claim 3, wherein the extended Kalman filter is a continuous-time, discrete-sample extended Kalman filter.

5. The method of claim 1, wherein the compound comprises a number of layers.

6. The method of claim 5, wherein the number of magnets are embedded in each layer.

7. The method of claim 1, wherein the number of magnets comprise permanent magnets.

8. The method of claim 1, further comprising controlling the temperature or heat sources according to a specified desired internal temperature of the compound.

9. The method of claim 1, wherein controlling the temperature or heat sources further comprises nonlinear feedback control.

10. The method of claim 9, wherein an internal temperature trajectory over time is selected to minimize temperature gradients within the compound during curing.

11. The method of claim 9, wherein an internal temperature trajectory over time is selected to minimize total cure time.

12. The method of claim 9, wherein an internal temperature trajectory over time is selected to minimize shrinkage or internal stresses.

13. The method of claim 9, wherein an internal temperature trajectory over time is selected to avoid high peak temperatures that damage the compound.

14. The method of claim 1, wherein the compound is located:
    inside a mold;
    on top of a flat horizontal surface; or
    between a number of objects;
    wherein the mold, flat surface, or objects are coupled to the temperature or heat sources.

15. A system for sensing and controlling temperature, the system comprising:
    a number of surfaces configured to hold a compound;
    a number of temperature or heat sources coupled to the number of surfaces;
    a number of magnets positioned to be in thermal communication with the compound held by the number of surfaces;
    a number of magnetic sensors positioned to be in electromagnetic communication with the number of magnets;
    a number of processors in communication with the number of magnetic sensors and temperature or heat sources, wherein the number of processors are configured to execute program instructions to:
        detect, via the magnetic sensors, changes in the magnetic field of the number of magnets;

determine a temperature of the compound held by the number of surfaces according to a model that maps magnetic field characteristics to temperature;

estimate an amount of cure of the compound according to the temperature; and control the temperature or heat sources in response to the temperature and the estimated amount of cure.

16. The system of claim 15, wherein the compound is an exothermic polymer.

17. The system of claim 15, wherein the amount of cure is estimated from the temperature inside the compound using an extended Kalman filter.

18. The system of claim 17, wherein the extended Kalman filter is a continuous-time, discrete-sample extended Kalman filter.

19. The system of claim 15, wherein the compound comprises a number of layers.

20. The system of claim 19, wherein a number of magnets are embedded in each layer.

21. The system of claim 15, wherein the number of surfaces holding the compound comprise:

a mold;

a flat horizontal surface; or a number of objects between which the compound is located.

* * * * *